(12) United States Patent
Chen et al.

(10) Patent No.: US 11,875,029 B2
(45) Date of Patent: Jan. 16, 2024

(54) VIDEO DISPLAY METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventors: Yu Chen, Shenzhen (CN); Yezi Lv, Shenzhen (CN); Heng Liu, Shenzhen (CN); Yuyan Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/986,208

(22) Filed: Nov. 14, 2022

(65) Prior Publication Data

US 2023/0073128 A1   Mar. 9, 2023

Related U.S. Application Data

(63) Continuation of application No. PCT/CN2022/086754, filed on Apr. 14, 2022.

(30) Foreign Application Priority Data

Apr. 29, 2021   (CN) .......................... 202110475658.8

(51) Int. Cl.
*G06F 3/0482* (2013.01)
*G06F 3/04847* (2022.01)
(Continued)

(52) U.S. Cl.
CPC ........ *G06F 3/04847* (2013.01); *G06F 3/0482* (2013.01); *G06F 16/735* (2019.01);
(Continued)

(58) Field of Classification Search
CPC ................................................ G06F 3/048–05
See application file for complete search history.

(56) References Cited

U.S. PATENT DOCUMENTS 8,055,655 B1 * 11/2011 He ...................... G06F 16/2477
707/727
9,110,988 B1 * 8/2015 Tan ........................ G06F 16/783
(Continued)

FOREIGN PATENT DOCUMENTS

| CN | 103793167 A | 5/2014 |
| CN | 103916718 A | 7/2014 |

(Continued)

OTHER PUBLICATIONS

The World Intellectual Property Organization (WIPO) International Search Report for PCT/CN2022/086754 dated May 27, 2022 6 Pages (including translation).

*Primary Examiner* — Daniel Rodriguez
(74) *Attorney, Agent, or Firm* — ANOVALAW GROUP PLLC (57) ABSTRACT

A video display method includes: displaying an initial video on a user interface in a first display mode; and displaying, in response to a video display mode of the user interface being switched from the first display mode to a second display mode, a target video associated with the initial video on the user interface in the second display mode, the first display mode and the second display mode having different video content display directions, and the target video including at least part of video content of the initial video.

18 Claims, 7 Drawing Sheets

(51) Int. Cl.
*G06F 16/738* (2019.01)
*G06F 16/78* (2019.01)
*G06F 16/735* (2019.01)
*G06V 20/70* (2022.01)
*G06V 10/762* (2022.01)
*G06V 20/40* (2022.01)

(52) U.S. Cl.
CPC ........ *G06F 16/738* (2019.01); *G06F 16/7867* (2019.01); *G06V 10/762* (2022.01); *G06V 20/48* (2022.01); *G06V 20/70* (2022.01)

(56) References Cited

U.S. PATENT DOCUMENTS

| | | | |
|---|---|---|---|
| 10,957,360 B1* | 3/2021 | Hastings | G06V 20/46 |
| 2008/0301167 A1* | 12/2008 | Goldeen | H04N 21/278 |
| | | | 707/999.102 |
| 2008/0301739 A1* | 12/2008 | Goldeen | H04N 7/17318 |
| | | | 725/88 |
| 2013/0024758 A1* | 1/2013 | Darby | G06F 16/50 |
| | | | 715/205 |
| 2013/0110978 A1* | 5/2013 | Gordon | H04N 21/4788 |
| | | | 709/218 |
| 2014/0118258 A1 | 5/2014 | Park et al. | |
| 2015/0310012 A1* | 10/2015 | Kim | G06F 16/5854 |
| | | | 707/722 |
| 2016/0042252 A1* | 2/2016 | Sawhney | G06F 16/5838 |
| | | | 382/190 |
| 2016/0086336 A1* | 3/2016 | Lin | G06T 7/74 |
| | | | 348/50 |
| 2017/0011714 A1* | 1/2017 | Eim | G06F 1/1677 |
| 2017/0062012 A1* | 3/2017 | Bloch | G11B 27/34 |
| 2018/0007286 A1* | 1/2018 | Li | H04N 5/2628 |
| 2018/0007409 A1* | 1/2018 | Xie | H04N 21/44204 |
| 2018/0014049 A1* | 1/2018 | Griffin | H04N 21/23439 |
| 2018/0041820 A1* | 2/2018 | Xu | H04N 21/8456 |
| 2019/0138554 A1* | 5/2019 | Remis | G06V 40/172 |
| 2020/0267435 A1* | 8/2020 | Gordon | H04N 21/8586 |
| 2020/0296317 A1* | 9/2020 | Post, Jr. | H04N 7/0122 |
| 2020/0322684 A1* | 10/2020 | Dong | H04N 21/4668 |
| 2023/0097683 A1* | 3/2023 | Liu | G06F 16/78 |
| | | | 386/241 |
| 2023/0137492 A1* | 5/2023 | Zheng | G06F 3/04847 |
| | | | 715/719 |

FOREIGN PATENT DOCUMENTS

| | | |
|---|---|---|
| CN | 110769300 A | 2/2020 |
| CN | 112073583 A | 12/2020 |
| EP | 2101243 A1 | 9/2009 |
| KR | 20110125356 A | 11/2011 |

\* cited by examiner

VIDEO DISPLAY METHOD AND APPARATUS, COMPUTER-READABLE MEDIUM, AND ELECTRONIC DEVICE

CROSS-REFERENCES TO RELATED APPLICATIONS

This application is a continuation application of PCT Patent Application No. PCT/CN2022/086754, filed on Apr. 14, 2022, which claims priority to Chinese Patent Application No. 202110475658.8, entitled "VIDEO DISPLAY METHOD AND APPARATUS, COMPUTER-READABLE MEDIUM, AND ELECTRONIC DEVICE" and filed with the China National Intellectual Property Administration on Apr. 29, 2021, the entire contents of both of which are incorporated herein by reference.

FIELD OF THE TECHNOLOGY

The present disclosure belongs to the field of computer technologies, and specifically, to video display.

BACKGROUND OF THE DISCLOSURE

When a user browses a video he is interested in on a video playback platform, to continue watching the content related to the video, he generally needs to search for other videos related to the video on the current platform or switch to other platforms. This video watching method makes the user spend more time and energy in video searching and switching, and user experience is relatively poor.

SUMMARY

The objective of embodiments of the present disclosure is to provide a video display method, a video display apparatus, a computer-readable medium, and an electronic device, to overcome, at least to some extent, technical problems such as low video searching and switching efficiency, a long interaction process, and the like in the related art.

Other features and advantages of the present disclosure become obvious through the following detailed descriptions, or may be partially learned partially through the practice of the present disclosure.

According to an aspect of the embodiments of the present disclosure, a video display method is provided, including: displaying an initial video on a user interface in a first display mode; and displaying, in response to a video display mode of the user interface being switched from the first display mode to a second display mode, a target video associated with the initial video on the user interface in the second display mode, the first display mode and the second display mode having different video content display directions, and the target video including at least part of video content of the initial video.

According to an aspect of the embodiments of the present disclosure, a video display apparatus is provided, including: a first display module, configured to display an initial video on a user interface in a first display mode; and a second display module, configured to display, in response to a video display mode of the user interface being switched from the first display mode to a second display mode, a target video associated with the initial video on the user interface in the second display mode, the first display mode and the second display mode having different video content display directions, and the target video including at least part of video content of the initial video.

According to an aspect of the embodiments of the present disclosure, a non-transitory computer-readable medium is provided, storing a computer program, the computer program, when executed by a processor, implementing the video display method in the foregoing technical solutions.

According to an aspect of the embodiments of the present disclosure, an electronic device is provided, including: a processor; and a memory, configured to store executable instructions of the processor; the processor being configured to execute the executable instructions to perform the video display method in the foregoing technical solutions.

In the technical solutions provided in the embodiments of the present disclosure, by detecting the video display mode of the user interface, when the video display mode is switched from the first display mode to the second display mode, other videos related to the display content can be automatically switched. Therefore, the video searching and switching efficiency is improved, and the computing power consumption of a computer device is reduced. The technical solutions provided in the embodiments of the present disclosure save a searching and finding process of the user for related videos, thereby reducing an interaction process of the user and providing the user with an immersive video watching experience.

It is to be understood that the foregoing general descriptions and the following detailed descriptions are merely for illustration and explanation purposes and are not intended to limit the present disclosure.

DESCRIPTION OF EMBODIMENTS

Exemplary implementations are now described more comprehensively with reference to the accompanying drawings. However, the examples of implementations may be implemented in various forms, and it should not be understood as being limited to the examples described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, more specific details are provided to provide a comprehensive understanding of the embodiments of the present disclosure. However, a person skilled in the art is to be aware that, the technical solutions in the present disclosure may be implemented without one or more of the specific details, or another method, unit, apparatus, or step may be used. In other cases, well-known methods, apparatuses, implementations, or operations are not shown or described in detail, to avoid obscuring aspects of the present disclosure.

The block diagrams shown in the accompanying drawings are merely functional entities and do not necessarily correspond to physically independent entities. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
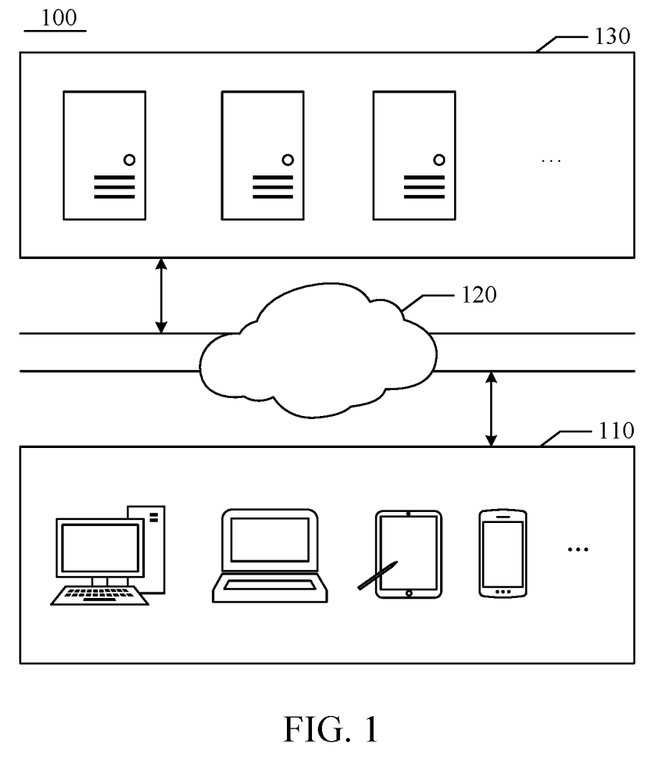
FIG. 1 is a schematic block diagram of an exemplary system architecture applying a technical solution of the present disclosure.

FIG. 1 is a schematic block diagram of an exemplary system architecture applying a technical solution of the present disclosure.

As shown in FIG. 1, a system architecture 100 may include a terminal device 110, a network 120 and a server 130. The terminal device 110 may include various electronic devices such as be a smartphone, a tablet computer, a notebook computer and a desktop computer. The server 130 may be an independent physical server, or may be a server cluster composed of a plurality of physical servers or a distributed system, and may further be a cloud server that provides cloud computing services. The network 120 may be a communication medium capable of providing various connection types of a communication link between the terminal device 110 and the server 130. For example, the network 120 may be a wired communication link or a wireless communication link.

The system architecture in some embodiments of the present disclosure may be any quantity of terminal devices, any quantity of networks, and any quantity of servers according to an implementation requirement. For example, the server 130 may be a server cluster that includes a plurality of servers. In addition, the technical solutions provided in the embodiments of the present disclosure may be applied to the terminal device 110 or the server 130, or may be jointly implemented by the terminal device 110 and the server 130, which is not specifically limited in the present disclosure.

For example, a video client can be installed on the terminal device 110, and a user can perform data communication with the server 130 by accessing the video client to obtain a video data stream delivered by the server 130, so as to watch a network video online on the terminal device 110.

According to a duration, videos can generally be divided into three types: short videos, medium videos and long videos. For example, a short video may be a video with a duration of less than 5 minutes, a medium video may be a video with a duration of 5 to 30 minutes, and a long video may be a video with a duration of more than 30 minutes.

In the related art of the present disclosure, taking a short video application that provides a short video playback service as an example, the user can browse and watch the short video delivered by a server through the short video application installed on a terminal device. When the user watches a short video of interest, if he wants to continue watching other content related to the short video, he needs to actively search for other videos related to the short video content. For example, if a short video is a video clip formed by editing content of a certain film and television work, when the user wants to watch complete content of the film and television work, he needs to learn in advance relevant information such as the work name and the character roles of the film and television work, then switch to an application that provides a service of playing film and television works, and then use the relevant information to search for the complete content of the film and television work. This process undoubtedly requires the user to perform a lot of interaction operations and wastes a lot of time and energy.

For the problems existing in the foregoing related art, the embodiments of the present disclosure mainly provide a technical solution for jumping to play a related video by switching a video playing mode. Detailed descriptions of the video display method, the video display apparatus, the computer-readable medium and the electronic device provided in the embodiments of the present disclosure are given below with reference to example embodiments.

Figure 2:
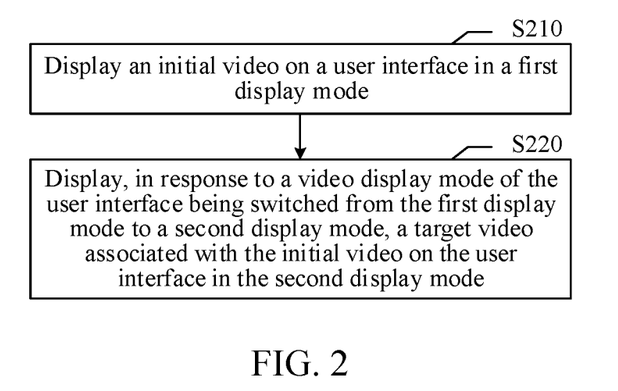
FIG. 2 is a flowchart of steps of a video display method according to an embodiment of the present disclosure.

FIG. 2 is a flowchart of steps of a video display method according to an embodiment of the present disclosure. The video display method may be performed by a computer device. The computer device includes a terminal device or a server. For example, the video display method may be performed by the terminal device or the server, or may further be jointly performed by the terminal device and the server. In some embodiments of the present disclosure, an example in which a video display method is performed on a terminal device is used for description. As shown in FIG. 2, the video display method may include the following S210 to S220.

S210: Display an initial video on a user interface in a first display mode.

The user interface (UI) is a medium performing an operation interaction and an information interaction between an application installed on a terminal device and a user, and may also be referred to as an interaction interface, which is displayed to the user through a display screen of the terminal device. When the video is displayed on the user interface, it can be divided into at least two different video display modes according to different size directions of the user interface, such as a first display mode and a second display mode. The first display mode and the second display mode have different video content display directions.

The video content display direction has relevance to a shape, a size, a structure, or the like of the terminal device. For example, a rectangular terminal device, such as a mobile phone, may have two different video content display directions: a landscape mode (a horizontal display direction) and a portrait mode (a vertical display direction). The second display mode refers to a video display mode in which a horizontal size of the user interface is greater than a vertical size of the user interface, and the first display mode refers to a video display mode in which a horizontal size of the user interface is less than a vertical size of the user interface. At present, short videos are basically played in a portrait mode.

In another example, for a terminal device with a rear screen, a front screen mode and a rear screen mode may be provided. The front screen mode is a direction in which the video content is displayed through a front display screen, and the rear screen mode is a direction in which the video content is displayed through a rear display screen. Correspondingly, the foregoing landscape mode and portrait mode can also be combined to obtain a plurality of video content display directions such as a portrait mode of the front screen and a landscape mode of the rear screen.

In another example, for a terminal device with a special-shaped screen, various corresponding video content display directions may be defined based on the rotation and orientation of the special-shaped screen, and details are not described herein again.

S220: Display, in response to a video display mode of the user interface being switched from the first display mode to a second display mode, a target video associated with the initial video on the user interface in the second display mode.

The first display mode and the second display mode have different video content display directions, and the target video includes at least part of video content of the initial video.

When displaying the initial video on the user interface, the video display mode of the user interface can be detected in real time. If it is detected that the video display mode is switched from the first display mode to the second display mode, a target video having an association relationship with the initial video can be displayed in the second display mode. The target video may be another video having content relevance to the initial video. For example, the target video may be another video having at least a part of the same content as the initial video.

Figure 3:
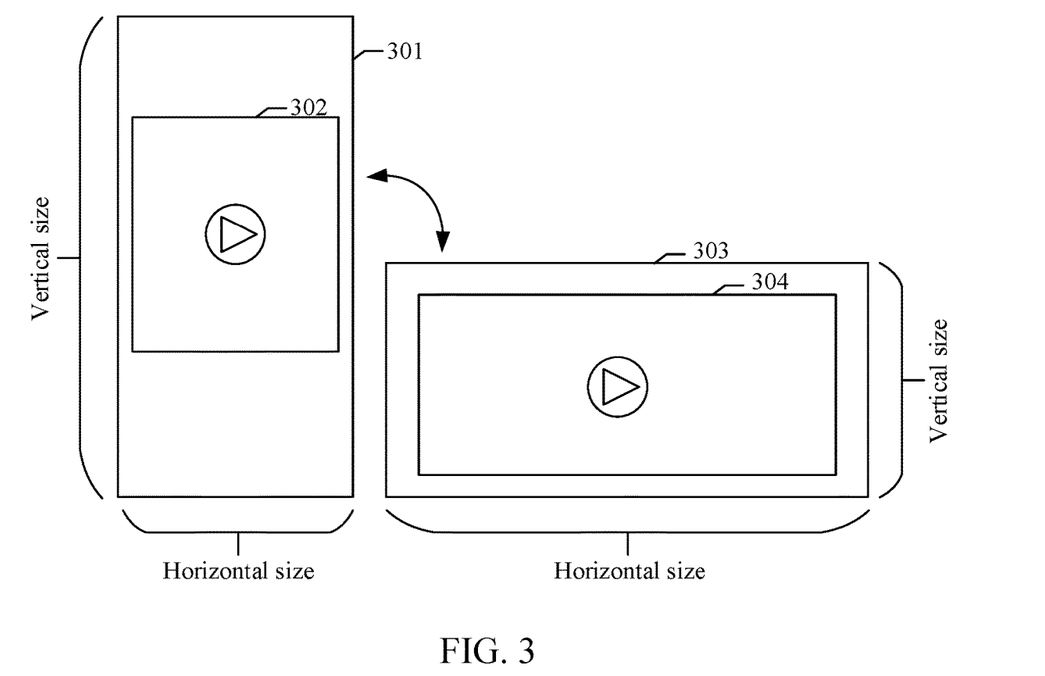
FIG. 3 is a schematic diagram of an interface change of changing video display content based on the switching of video display modes in an application scenario according to an embodiment of the present disclosure.

FIG. 3 is a schematic diagram of an interface change of changing video display content based on the switching of video display modes in an application scenario according to an embodiment of the present disclosure. A first display mode is a portrait mode, and a second display mode is a landscape mode. As shown in FIG. 3, a first user interface 301 on the left side of the figure displays an initial video 302 in a portrait mode, and in the portrait mode, a horizontal size of the first user interface 301 is less than a vertical size of the first user interface 301; and when the video display mode is switched from a portrait mode to a landscape mode, a second user interface 303 on the right side of the figure displays a target video 304 in a landscape mode, and in the landscape mode, a horizontal size of the second user interface 303 is greater than a vertical size of the second user interface 303.

In an embodiment of the present disclosure, the initial video has a video duration less than or equal to a duration threshold, such as a short video; and the target video has a video duration greater than the duration threshold, such as a medium-length video. In some embodiments of the present disclosure, the user interface displays a short video with a relatively short video duration in the first display mode. When it is detected that the video display mode is switched from the first display mode to the second display mode, the currently displayed short video can be closed, and in addition, a medium-length video with a relatively long video duration is displayed in the second display mode.

In an embodiment of the present disclosure, the initial video is a video clip including part of the video content in the target video. For example, the target video is a 1-hour video, such as a movie or TV series; and the initial video may be a 5-minute video clip formed by capturing part of the video content from the video. All the video content of the initial video may be included in the target video, or only a part of the video content may be included in the target video, which is not limited in the present disclosure.

In some embodiments of the present disclosure, the initial video is a video clip including a piece of video content, and the target video may be a complete video including the video content. The target video may also be another video clip including the video content and whose duration is greater than that of the initial video.

In the video display method provided in the embodiments of the present disclosure, by detecting the video display mode of the user interface, when the video display mode is switched from the first display mode to the second display mode, target videos related to the display content can be automatically switched. Therefore, the video searching and switching efficiency is improved, and the computing power consumption of a computer device is reduced. The video display method provided in the embodiments of the present disclosure save a searching and finding process of the user for related videos, thereby reducing an interaction process of the user and providing the user with an immersive video watching experience.

In one embodiment, when the first display mode is a portrait mode, the second display mode is a landscape mode; or when the first display mode is a landscape mode, the second display mode is a portrait mode.

That is, the user can watch the initial video in a portrait mode through the configuration of the terminal device. If the user needs to view the complete video content corresponding to the initial video, he can quickly view a target video that matches the initial video by changing the display mode and switching from the portrait mode to the landscape mode. Alternatively, in another terminal device arrangement method, the target video is viewed by switching from the landscape mode to the portrait mode.

Figure 4:
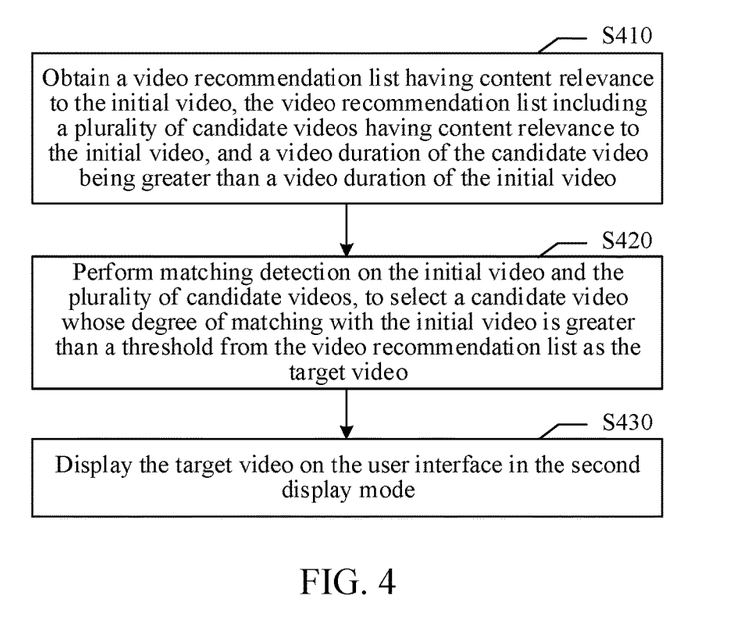
FIG. 4 is a flowchart of steps of displaying a target video in a landscape mode according to an embodiment of the present disclosure.

FIG. 4 is a flowchart of steps of displaying a target video in a second display mode according to an embodiment of the present disclosure. As shown in FIG. 4, on the basis of the foregoing embodiments, the displaying a target video associated with the initial video on the user interface in the second display mode in S220 may include the following S410 to S430.

S410: Obtain a video recommendation list having content relevance to the initial video, the video recommendation list including a plurality of candidate videos having content relevance to the initial video, and a video duration of the candidate video being greater than a video duration of the initial video.

In some embodiments of the present disclosure, a video database including a large quantity of video content can be obtained in advance, and each video in the video database can be classified and aggregated according to a designated granularity (such as episodes, IP, or characters) to form a large quantity of candidate video lists. Any two candidate video lists may have completely different video content, or may have partially identical video content. Based on the content relevance, an association relationship between the initial video and one or more of the candidate video lists can be established in advance, so that a video recommendation list having content relevance to the initial video can be obtained when displaying the initial video.

In an embodiment of the present disclosure, all candidate videos in each candidate video list are medium-length videos whose video durations are greater than a duration threshold.

In an embodiment of the present disclosure, all candidate videos in each candidate video list are second display videos suitable for being displayed in the second display mode.

S420: Perform matching detection on the initial video and the plurality of candidate videos, to select a candidate video whose degree of matching with the initial video is greater than a threshold from the video recommendation list as the target video.

The method for performing the matching detection on the initial video and the candidate videos may include at least one of image matching detection and label matching detection.

In an embodiment of the present disclosure, the image matching detection method is used to obtain a degree of matching between the initial video and the candidate videos. In some embodiments of the present disclosure, an image content comparison can be performed on part of video images of the initial video and the candidate videos. When a certain frame of video images of the initial video and any frame of video images of the candidate videos have the same or similar image content, it indicates that the two videos have a relatively high degree of matching. Conversely, if a certain frame of video images of the initial video is significantly different from all video images in the candidate videos, it indicates that the two videos have a relatively low degree of matching.

In an embodiment of the present disclosure, the label matching detection method is used to obtain a degree of matching between the initial video and the candidate videos. In some embodiments of the present disclosure, corresponding content labels may be assigned to the initial video and the candidate videos in advance according to video content features. When the initial video and a candidate video have content labels with a relatively high overlap ratio, it indicates that the two videos have a relatively high degree of matching. Conversely, if the content labels of the initial video and a candidate video are significantly different, it indicates that the two videos have a relatively low degree of matching. Therefore, a candidate video with a high degree of matching with the initial video can be used as the target video, and in one embodiment, the candidate video with a highest degree of matching with the initial video can be used as the target video.

In an embodiment of the present disclosure, the methods of image matching detection and label matching detection can be used simultaneously, and the degree of matching between the initial video and the candidate videos can be comprehensively evaluated according to an image matching result and a label matching result.

S430: Display the target video on the user interface in the second display mode.

After the target video is obtained, the target video can be played and displayed from a video starting position of the target video, or can be played and displayed from an intermediate position of the target video.

In an embodiment of the present disclosure, the method of displaying the target video from an intermediate position of the target video may include: obtaining a current video image of the initial video; searching the target video for a video timestamp corresponding to the current video image; and displaying the target video on the user interface in the second display mode by using the video timestamp as a current playback progress, so that the target video in the second display mode can seamlessly resume content after corresponding content of the initial video.

In some embodiments of the present disclosure, the current video image may include the last frame or a plurality of frames of video images of the initial video displayed on the user interface before switching from the first display mode to the second display mode. In some embodiments of the present disclosure, a target video image with the same image content as the current video image can be searched in the target video, and a time node (i.e., time stamp) where the target video image is located is used as a corresponding video timestamp of the current video image. Based on this, by using the video timestamp as a current playback progress to play the target video in the second display mode, a visual effect of seamless connection in the video content of the initial video and the target video can be achieved.

Figure 5:
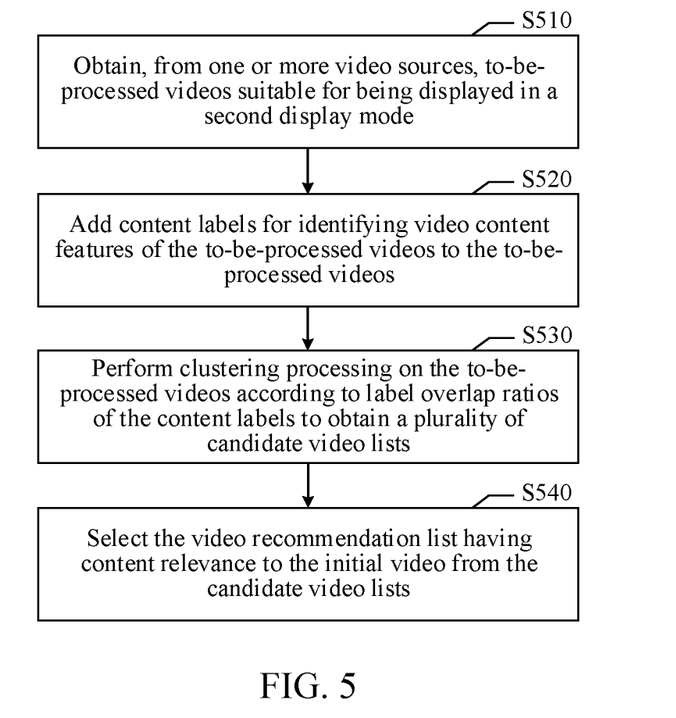
FIG. 5 is a flowchart of steps of obtaining a video recommendation list according to an embodiment of the present disclosure.

FIG. 5 is a flowchart of steps of obtaining a video recommendation list according to an embodiment of the present disclosure. As shown in FIG. 5, on the basis of the foregoing embodiments, the obtaining a video recommendation list having content relevance to the initial video in S410 may include the following S510 to S540.

S510: Obtain, from one or more video sources, to-be-processed videos suitable for being displayed in a second display mode.

The video sources for obtaining to-be-processed videos may include an internal video database of a video service platform where the initial video is located, and may further include an external video database of other video service platforms.

S520: Add content labels for identifying video content features of the to-be-processed videos to the to-be-processed videos.

In some embodiments of the present disclosure, content labels based on a plurality of designated dimensions can be added to the to-be-processed videos. Corresponding label dimensions may include video names, characters, video types, or the like.

S530: Perform clustering processing on the to-be-processed videos according to label overlap ratios of the content labels to obtain a plurality of candidate video lists.

Overlap ratio calculation is performed on the content labels of the to-be-processed videos under a plurality of label dimensions, and the to-be-processed videos are sorted according to the overlap ratios, so that a plurality of candidate video lists can be formed by clustering. The to-be-processed videos in each candidate video list have relatively high label overlap ratios.

S540: Select the video recommendation list having content relevance to the initial video from the candidate video lists.

In some embodiments of the present disclosure, the content labels of the initial video can be compared with label combinations corresponding to the candidate video lists, to select one or more video recommendation lists having content relevance to the initial video.

Figure 6:
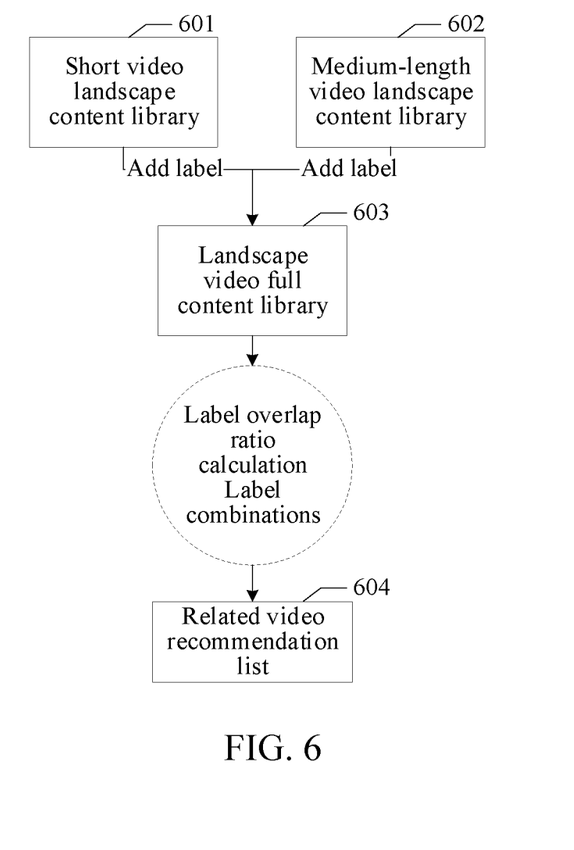
FIG. 6 is a schematic diagram of a process of constructing a video recommendation list according to an embodiment of the present disclosure.

FIG. 6 is a schematic diagram of a process of constructing a video recommendation list according to an embodiment of the present disclosure. An example in which a portrait mode is used as a first display mode and a landscape mode is used as a second display mode is used. As show in FIG. 6, in some embodiments of the present disclosure, a landscape content library 601 (feedid) of a short video platform and a landscape content library 602 (vid) of a medium-length video platform can be selected as video sources. All videos in the landscape content library 601 of the short video platform are videos suitable for displaying in a landscape mode. All videos in the landscape content library 602 of the medium-length video platform are medium-length videos suitable for displaying in a landscape mode. For example, a to-be-processed video (a medium video) with a duration of 5-30 minutes and a to-be-processed video (a long video) with a duration of more than 30 minutes may be included.

In some embodiments of the present disclosure, content labels can be added to the video contents in the video sources through a pre-trained machine learning model according to same structure and granularity, and formed into a landscape video full content library 603 (vid+feedid).

Videos carrying the content labels can be automatically aggregated to generate a large quantity of related video recommendation lists 604 under specific label dimensions after calculating and sorting the label overlap ratios.

In an embodiment of the present disclosure, in addition to relying on algorithm calculation to screen and sort the video contents to form a video recommendation list, manual intervention can also be used to sort each video in the video recommendation list, or the video recommendation list may be created by manual intervention. For example, in some embodiments of the present disclosure, list editing instructions input by the user can be obtained, and a video recommendation list can be adjusted or created according to the list editing instructions. The list editing instructions may include, for example, various instructions triggered based on clicking, sliding, or other touch operations, and editing operations such as adding, deleting, and sorting videos in the video recommendation list may be implemented based on related instructions.

Figure 7:
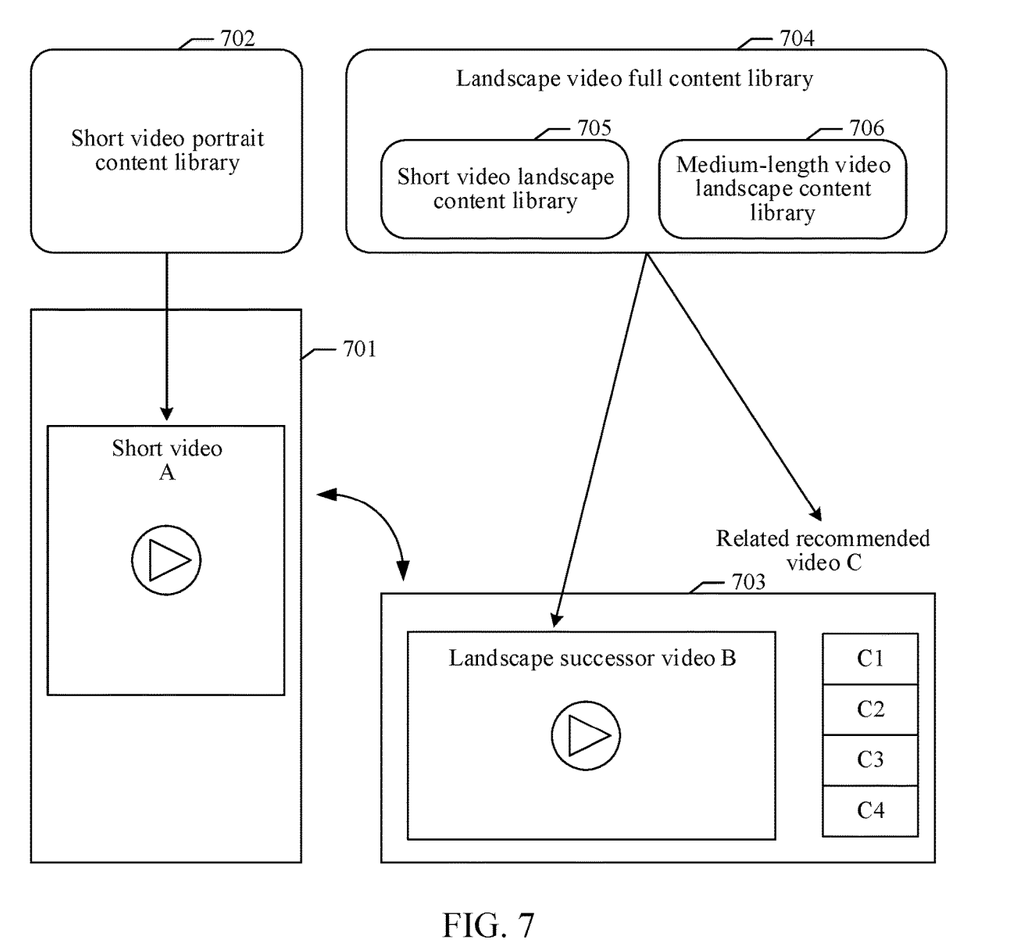
FIG. 7 is a schematic diagram of an effect of switching videos based on different data sources according to an embodiment of the present disclosure.

FIG. 7 is a schematic diagram of an effect of switching videos based on different data sources according to an embodiment of the present disclosure. An example in which a portrait mode is used as a first display mode and a landscape mode is used as a second display mode is used. As shown in FIG. 7, a short video A is displayed in a first user interface 701 based on a portrait mode. The short video A is from a short video portrait content library 702, and all videos in the short video portrait content library 702 are portrait videos suitable for displaying using a data mode. When the first user interface 701 based on the portrait mode is switched to a second user interface 703 based on a landscape mode, the currently displayed short video A can be switched to a landscape successor video B and a related recommended video C on the user interface. A video recommendation list formed by the landscape successor video B and the related recommended video C is from a landscape video full content library 704. A short video landscape content library 705 and a medium-length video landscape content library 706 may be included in the landscape video full content library 704.

For example, if the short video A is a video clip of the first episode of a TV series, then the landscape successor video B may be a complete video of the first episode of the TV series, and the related recommended video C may be other episodes in the TV series and other video clips of the TV series.

In some embodiments of the present disclosure, a portrait short video is associated with a landscape medium-length video recommendation list, and an existing image recognition capability of the platform is used to match the videos in the list through credential stuffing, and combined with the label overlap ratios, a medium-length video with the highest degree of matching is calculated as a successor video for switching the landscape. Therefore, when being switched from a portrait short video to a landscape medium-length video, the video can be accurately positioned to a current playback position to be continuously played.

Figure 8:
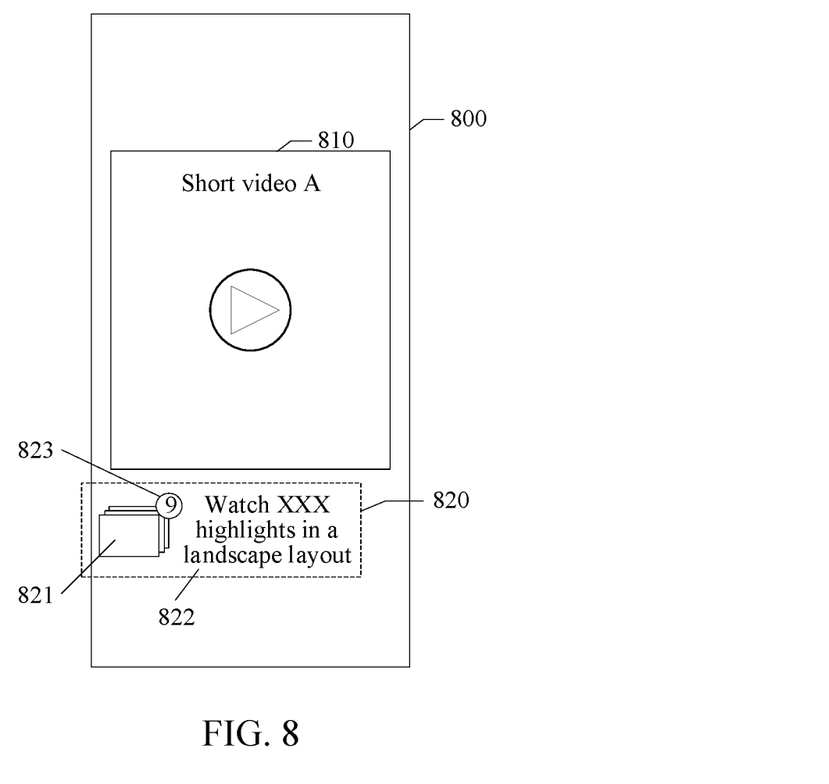
FIG. 8 is a schematic diagram of a user interface based on a portrait mode in an application scenario according to an embodiment of the present disclosure.

FIG. 8 is a schematic diagram of a user interface based on a portrait mode in an application scenario according to an embodiment of the present disclosure. As shown in FIG. 8, a portrait video 810 based on a portrait mode (a first display mode) can be displayed on a user interface 800, and in addition, a mode switching control 820 can be displayed on the user interface 800. The mode switching control 820 is used for switching the video display mode under the trigger of an operation of the user. In some embodiments of the present disclosure, in response to a trigger operation (such as a click operation) acting on the mode switching control 820, the video display mode of the user interface can be switched from the portrait mode to the landscape mode (the second display mode).

Still referring to FIG. 8, in an embodiment of the present disclosure, a mode switching control is displayed on the user interface. In response to a trigger operation acting on the mode switching control, the video display mode of the user interface from the first display mode is switched to the second display mode. The mode switching control 820 may include at least one control element; the control element, for example, includes one or more of an image element 821, a text element 822 and a quantity element 823. The image element 821 is used for identifying a list image of the video recommendation list associated with the initial video, the text element 822 is used for identifying a list name of the video recommendation list, and the quantity element 823 is used for identifying a video quantity of videos in the video recommendation list.

In some embodiments of the present disclosure, in addition to configuring a mode switching control on the user interface, other methods may also be used for implementing the switching function of the video display mode. For example, the video display mode can be switched from the first display mode to the second display mode according to a preset touch gesture (such as a sliding gesture in a set direction). In addition, in some embodiments of the present disclosure, the second display mode may also be entered through other channels such as out-of-terminal jump and message push, to display a video stream corresponding to the target video.

In an embodiment of the present disclosure, when the video content is displayed on the user interface of the terminal device, attitude information of the terminal device can be obtained. For example, attitude detection can be performed on a gyroscope configured in the terminal device. Taking a portrait mode as a first display mode and a landscape mode as a second display mode as an example, when it is detected that the terminal device is converted from a portrait attitude to a landscape attitude, the video display mode on the user interface can be automatically triggered to switch from a portrait mode to a landscape mode. In an application scenario, the user can watch a short video in a posture of vertically holding the mobile phone. When the user converts the posture from vertically holding the mobile phone to horizontally holding the mobile phone, the user can switch from the currently played short video to playing a medium-length video associated with the short video.

Figure 9:
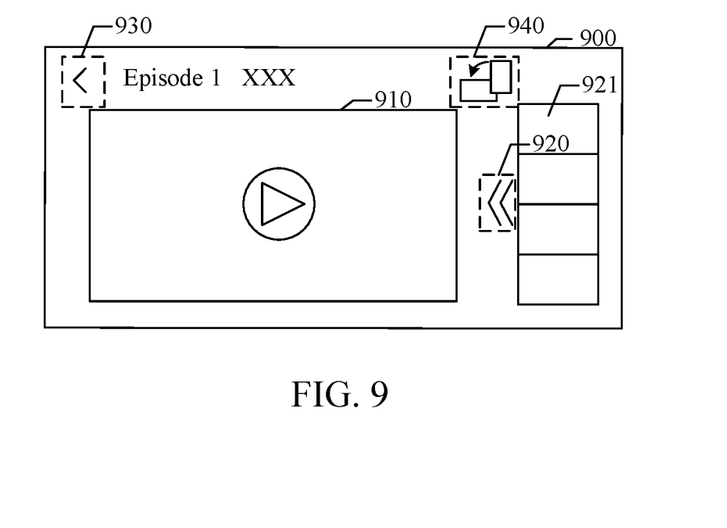
FIG. 9 is a schematic diagram of a user interface based on a landscape mode in an application scenario according to an embodiment of the present disclosure.

An example in which a portrait mode is used as a first display mode and a landscape mode is used as a second display mode is used. FIG. 9 is a schematic diagram of a user interface based on a landscape mode in an application scenario according to an embodiment of the present disclosure. As shown in FIG. 9, a landscape video 910 based on a landscape mode can be displayed on the user interface 900, and in addition, a list expansion control 920 can be displayed on the user interface 900. In response to a trigger operation (such as a click operation or a sliding operation) acting on the list expansion control 920, a video recommendation list 921 associated with an initial video displayed in a portrait mode can be displayed on the user interface 900. The video recommendation list 921 includes a plurality of candidate videos having content relevance to the initial video, and a video duration of the candidate video is greater than a video duration of the initial video. For example, the initial video is a short video, and the candidate video is a medium-length video.

In an embodiment of the present disclosure, when the user triggers to select a candidate video in the video recommendation list 921, video content of the selected candidate video can be switched to be displayed. In some embodiments of the present disclosure, in response to a video selection operation acting on the video recommendation list, the target video displayed on the user interface in the landscape mode is switched to a selected video.

After the target video displayed on the user interface in the landscape mode is switched to a candidate video selected by the user, the video recommendation list 921 can be updated according to the selected video, that is, the video recommendation list 921 will be updated in real time according to the video content displayed on the user interface in the landscape mode.

Still referring to FIG. 9, a return control 930 may further be displayed on the user interface 900. In some embodiments of the present disclosure, in response to a trigger operation (such as a click operation) acting on the return control 930, a current video displayed on the user interface is switched to a previous video displayed before the current video, the previous video being a video displayed in the landscape mode or a video displayed in the portrait mode. In some embodiments of the present disclosure, when the user triggers the return control 930, if there is a previous video displayed based on the landscape mode, return to play the video; and if there is no previous video display content in the landscape mode before the current video, return to the portrait video displayed based on the portrait mode before entering the landscape mode.

Still referring to FIG. 9, a mode restore control 940 may further be displayed on the user interface 900. In some embodiments of the present disclosure, in response to a trigger operation acting on the mode restore control, a current video displayed on the user interface in the landscape mode is switched to the initial video displayed on the user interface in the portrait mode. In the landscape mode, when the mode restore control 940 is clicked and triggered to be displayed, the portrait video displayed based on the portrait mode before entering the landscape mode can be directly returned to.

Some embodiments of the present disclosure provides the user with an ability of quickly and conveniently watching more medium-length videos in a second display form in short video apps. Compared with a traditional way of watching the medium-length videos by switching apps, it saves energy of the user and smartphone computing power, and improves consumption time and user stickiness of the user in the short video apps.

In an embodiment of the present disclosure, taking a portrait mode as a first display mode and a landscape mode as a second display mode as an example, when the video content is displayed on the user interface of the terminal device, attitude information of the terminal device can be obtained. For example, attitude detection can be performed on a gyroscope configured in the terminal device. When it is detected that the terminal device is converted from a landscape attitude to a portrait attitude, the video display mode on the user interface can be automatically triggered to switch from a landscape mode to a portrait mode, so as to return to the portrait video displayed before entering the landscape mode. In an application scenario, the user can watch a medium-length video in a posture of horizontally holding the mobile phone. When the user converts the posture from horizontally holding the mobile phone to vertically holding the mobile phone, the user can switch from the currently played medium-length video to a recently watched short video in the portrait mode.

In an embodiment of the present disclosure, additional information sharing across video sources may be performed between the second display mode and the first display mode. The additional information may include comment information such as a bullet comment, an emoticon and a text. For example, in the second display mode, bullet comment content of a second display video can be obtained synchronously from a video source of the second display video, so that the user can view or send video bullet comments when watching the video content.

In an embodiment of the present disclosure, the additional information may further include information such as a user type and a user level. For example, if the user registers as a VIP user at the video source of the second display video, when switching from the first display mode to the second display mode, user rights can be automatically obtained, so that the user can obtain extended user rights and interests on different video playback platforms.

In an embodiment of the present disclosure, the additional information may further include interaction information such as forwarding, liking, commenting, following, and favorites, so that the user can perform corresponding interactive operations in both the second display mode and the first display mode.

Although the steps of the method in the present disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 10:
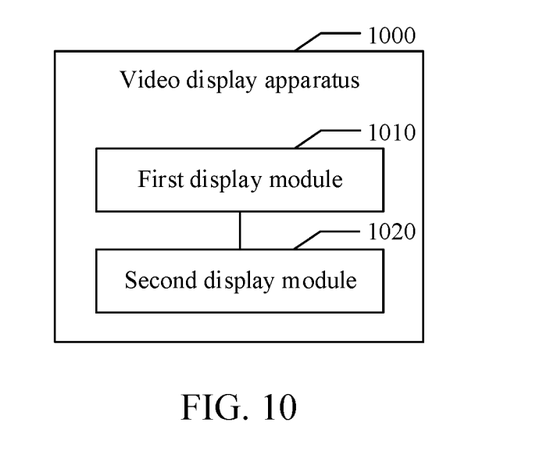
FIG. 10 is a schematic structural block diagram of a video display apparatus according to an embodiment of the present disclosure.

The following describes the apparatus embodiments of the present disclosure, which may be configured to perform the video display method in the foregoing embodiments of the present disclosure. FIG. 10 is a schematic structural block diagram of a video display apparatus according to an embodiment of the present disclosure. As shown in FIG. 10, a video display apparatus 1000 may mainly include: a first display module 1010, configured to display an initial video on a user interface in a first display mode; and a second display module 1020, configured to display, in response to a video display mode of the user interface being switched from the first display mode to a second display mode, a target video associated with the initial video on the user interface in the second display mode, the first display mode and the second display mode having different video content display directions, and the target video including at least part of video content of the initial video.

In some embodiments of the present disclosure, based on the foregoing embodiments, the initial video is a short video whose video duration is less than or equal to a duration threshold, and the target video is a medium-length video whose video duration is greater than the duration threshold.

In some embodiments of the present disclosure, based on the foregoing embodiments, the second display module 1020 includes: a list obtaining unit, configured to obtain a video recommendation list having content relevance to the initial video, the video recommendation list including a plurality of candidate videos having content relevance to the initial video, and a video duration of the candidate video being greater than a video duration of the initial video; a matching detection unit, configured to perform matching detection on the initial video and the plurality of candidate videos, to select a candidate video whose degree of matching with the initial video is greater than a threshold from the video recommendation list as the target video; and a video display unit, configured to display the target video on the user interface in the second display mode.

In some embodiments of the present disclosure, based on the foregoing embodiments, the list obtaining unit includes: a video obtaining subunit, configured to obtain, from one or more video sources, to-be-processed videos suitable for being displayed in the second display mode; a label adding subunit, configured to add content labels for identifying video content features of the to-be-processed videos to the to-be-processed videos; a video clustering subunit, configured to perform clustering processing on the to-be-processed videos according to label overlap ratios of the content labels to obtain a plurality of candidate video lists; and a list selection subunit, configured to select the video recommendation list having content relevance to the initial video from the candidate video lists.

In some embodiments of the present disclosure, based on the foregoing embodiments, the video display unit includes: an image obtaining subunit, configured to obtain a current video image of the initial video; a node searching subunit, configured to search the target video for a video timestamp corresponding to the current video image; and a node display subunit, configured to display the target video on the user interface in the second display mode by using the video timestamp as a current playback progress.

In some embodiments of the present disclosure, based on the foregoing embodiments, the video display apparatus 1000 further includes: a switching control display module, configured to display a mode switching control on the user interface; and a switching control response module, configured to switch, in response to a trigger operation acting on the mode switching control, the video display mode of the user interface from the first display mode to the second display mode.

In some embodiments of the present disclosure, based on the foregoing embodiments, the mode switching control includes at least one control element; the control element includes one or more of an image element, a text element and a quantity element; and the image element is used for identifying a list image of the video recommendation list associated with the initial video, the text element is used for identifying a list name of the video recommendation list, and the quantity element is used for identifying a video quantity of videos in the video recommendation list.

In some embodiments of the present disclosure, based on the foregoing embodiments, the video display apparatus 1000 further includes: an expansion control display module, configured to display a list expansion control on the user interface; and an expansion control response module, configured to display, in response to a trigger operation acting on the list expansion control, a video recommendation list associated with the initial video on the user interface, the video recommendation list including a plurality of candidate videos having content relevance to the initial video, and a video duration of the candidate video being greater than a video duration of the initial video.

In some embodiments of the present disclosure, based on the foregoing embodiments, the video display apparatus 1000 further includes: a list response module, configured to switch, in response to a video selection operation acting on the video recommendation list, the target video displayed on the user interface in the second display mode to a selected candidate video.

In some embodiments of the present disclosure, based on the foregoing embodiments, the video display apparatus 1000 further includes: a list update module, configured to update the video recommendation list according to the selected candidate video.

In some embodiments of the present disclosure, based on the foregoing embodiments, the video display apparatus 1000 further includes: a return control display module, configured to display a return control on the user interface; and a return control response module, configured to switch, in response to a trigger operation acting on the return control, a current video displayed on the user interface to a previous video displayed before the current video, the previous video being a video displayed in the second display mode or a video displayed in the first display mode.

In some embodiments of the present disclosure, based on the foregoing embodiments, the video display apparatus 1000 further includes: a restore control display module, configured to display a mode restore control on the user interface; and a restore control response module, configured to switch, in response to a trigger operation acting on the mode restore control, a current video displayed on the user interface in the second display mode to the initial video displayed in the first display mode.

In some embodiments of the present disclosure, based on the foregoing embodiments, when the first display mode is a portrait mode, the second display mode is a landscape mode; or when the first display mode is a landscape mode, the second display mode is a portrait mode.

Specific details of the video display apparatus provided in the embodiments of the present disclosure have been described in detail in the corresponding method embodiments, and details are not described herein again.

Figure 11:
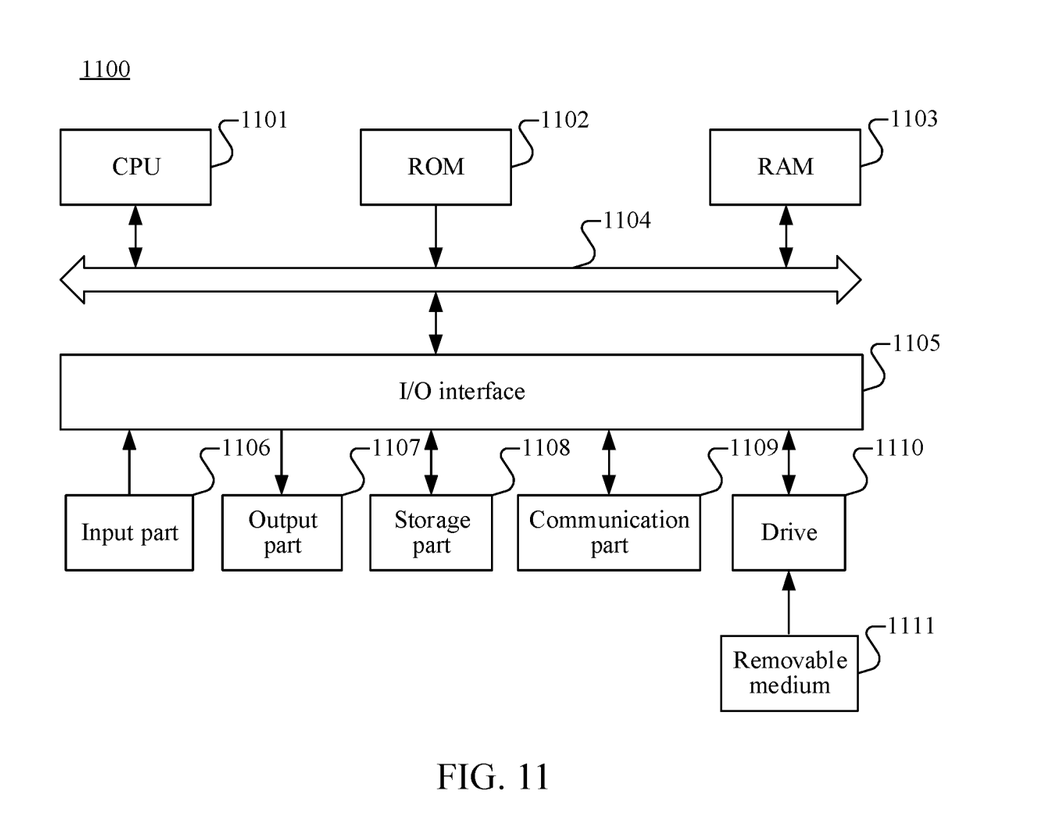
FIG. 11 is a schematic structural block diagram of a computer system adapted to implement an electronic device according to an embodiment of the present disclosure.

FIG. 11 is a schematic structural block diagram of a computer system configured to implement an electronic device according to an embodiment of the present disclosure.

The computer system 1100 of the electronic device shown in FIG. 11 is merely an example, and does not constitute any limitation on functions and use ranges of the embodiments of the present disclosure.

As shown in FIG. 11, the computer system 1100 includes a central processing unit (CPU) 1101. The CPU 1101 may perform various appropriate actions and processing according to a program stored in a read-only memory (ROM) 1102 or a program loaded from a storage portion 1108 into a random access memory (RAM) 1103. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard and a mouse, or the like; an output part 1107 including a cathode ray tube (CRT), a liquid crystal display (LCD), a speaker, or the like; a storage part 1108 including hard disk, or the like;

and a communication part 1109 including a network interface card such as a local area network card, a modem, or the like. The communication part 1109 performs communication processing by using a network such as the Internet. A drive 1110 is also connected to the I/O interface 1105 as required. A removable medium 1111, such as a magnetic disk, an optical disc, a magneto-optical disk, or a semiconductor memory, is mounted on the drive 1110 as required, so that a computer program read from the removable medium is installed into the storage part 1108 as required.

Particularly, according to an embodiment of the present disclosure, the processes described in the method flowcharts may be implemented as computer software programs. For example, some embodiments of the present disclosure includes a computer program product, the computer program product includes a computer program carried on a computer-readable medium, and the computer program includes program code used for performing the methods shown in the flowcharts. In such an embodiment, the computer program may be downloaded and installed from a network through the communication part 1109, and/or installed from the removable medium 1111. When the computer program is executed by the CPU 1101, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. Other example of the computer-readable storage medium may include but is not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

In addition, an embodiment of the present disclosure further provides a storage medium. The storage medium is configured to store a computer program. The computer program is configured to perform the methods provided in the foregoing embodiments.

The embodiments of the present disclosure further provide a computer program product including instructions is further provided. When the computer program product runs on a computer, the computer is caused to perform the method provided in the foregoing embodiments.

Although several modules or units of a device for action execution are mentioned in the foregoing detailed descriptions, the division is not mandatory. Actually, according to the implementations of the present disclosure, the features and functions of two or more modules or units described above may be specified in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

Other embodiments of the present disclosure will be apparent to a person skilled in the art from consideration of the specification and practice of the disclosure here. The present disclosure is intended to cover any variations, uses, or adaptive changes of the present disclosure. These variations, uses, or adaptive changes follow the general principles of the present disclosure and include common general knowledge or common technical means in the art, which are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is limited by the appended claims only.

What is claimed is:

1. A video display method, performed by a computer device, the method comprising:
  displaying an initial video on a user interface in a first display mode;
  obtaining, from one or more video sources, first videos suitable for being displayed in a second display mode;
  adding content labels for identifying video content features of the first videos to the first videos, the content labels being based on a plurality of designated dimensions including video names, characters, video types;
  performing clustering processing on the first videos according to label overlap ratios of the content labels to obtain a plurality of candidate video lists;
  selecting a video recommendation list having content relevance to the initial video from the plurality of candidate video lists; and
  displaying, in response to a video display mode of the user interface being switched from the first display mode to the second display mode, a target video selected from the video recommendation list associated with the initial video on the user interface in the second display mode, the first display mode and the second display mode having different video content display directions, and the target video comprising at least part of video content of the initial video.

2. The video display method according to claim 1, wherein the initial video has a video duration less than or equal to a duration threshold, and the target video has a video duration greater than the duration threshold.

3. The video display method according to claim 1, wherein the displaying the target video selected from the video recommendation list associated with the initial video on the user interface in the second display mode comprises:
  obtaining the video recommendation list having content relevance to the initial video, the video recommendation list comprising a plurality of candidate videos having content relevance to the initial video, and a video duration of the candidate video being greater than a video duration of the initial video;
  performing matching detection on the initial video and the plurality of candidate videos, to select a candidate video whose degree of matching with the initial video is greater than a threshold from the video recommendation list as the target video; and
  displaying the target video on the user interface in the second display mode.

4. The video display method according to claim 1, wherein the displaying the target video selected from the video recommendation list associated with the initial video on the user interface in the second display mode comprises:
  obtaining a current video image of the initial video;
  obtaining the target video associated with the initial video;
  searching the target video for a video timestamp corresponding to the current video image; and
  displaying the target video on the user interface in the second display mode by using the video timestamp as a current playback progress.

5. The video display method according to claim 1, wherein when a video is displayed on the user interface in the first display mode, the method further comprises:
  displaying a mode switching control on the user interface; and
  switching, in response to a trigger operation acting on the mode switching control, the video display mode of the user interface from the first display mode to the second display mode.

6. The video display method according to claim 5, wherein the mode switching control comprises at least one control element; the control element comprises one or more of an image element, a text element and a quantity element; and the image element is used for identifying a list image of the video recommendation list associated with the initial video, the text element is used for identifying a list name of the video recommendation list, and the quantity element is used for identifying a video quantity of videos in the video recommendation list.

7. The video display method according to claim 1, wherein the method further comprises:
  displaying a list expansion control on the user interface; and
  displaying, in response to a trigger operation acting on the list expansion control, a video recommendation list associated with the initial video on the user interface, the video recommendation list comprising a plurality of candidate videos having content relevance to the initial video, and a video duration of the candidate video being greater than a video duration of the initial video.

8. The video display method according to claim 7, wherein the method further comprises:
  switching, in response to a video selection operation acting on the video recommendation list, the target video displayed on the user interface in the second display mode to a selected candidate video.

9. The video display method according to claim 8, wherein the method further comprises:
  updating the video recommendation list according to the selected candidate video.

10. The video display method according to claim 1, wherein when a video is displayed on the user interface in the second display mode, the method further comprises:
  displaying a return control on the user interface; and
  switching, in response to a trigger operation acting on the return control, a current video displayed on the user interface to a previous video displayed before the current video, the previous video being a video displayed in the second display mode or a video displayed in the first display mode.

11. The video display method according to claim 1, wherein when a video is displayed on the user interface in the second display mode, the method further comprises:
  displaying a mode restore control on the user interface; and
  switching, in response to a trigger operation acting on the mode restore control, a current video displayed on the user interface in the second display mode to the initial video displayed in the first display mode.

12. The video display method according to claim 1, when the first display mode is a portrait mode, the second display mode is a landscape mode; or
  when the first display mode is a landscape mode, the second display mode is a portrait mode.

13. A video display apparatus, comprising:
  a processor; and
  a memory, configured to store executable instructions of the processor;
  the processor being configured to execute the executable instructions to perform:
    displaying an initial video on a user interface in a first display mode;

obtaining, from one or more video sources, first videos suitable for being displayed in a second display mode;

adding content labels for identifying video content features of the first videos to the first videos, the content labels being based on a plurality of designated dimensions including video names, characters, video types;

performing clustering processing on the first videos according to label overlap ratios of the content labels to obtain a plurality of candidate video lists;

selecting a video recommendation list having content relevance to the initial video from the plurality of candidate video lists; and displaying, in response to a video display mode of the user interface being switched from the first display mode to the second display mode, a target video selected from the video recommendation list associated with the initial video on the user interface in the second display mode, the first display mode and the second display mode having different video content display directions, and the target video comprising at least part of video content of the initial video.

14. The video display apparatus according to claim 13, wherein the initial video has a video duration less than or equal to a duration threshold, and the target video has a video duration greater than the duration threshold.

15. The video display apparatus according to claim 13, wherein the displaying the target video selected from the video recommendation list associated with the initial video on the user interface in the second display mode comprises:

obtaining the video recommendation list having content relevance to the initial video, the video recommendation list comprising a plurality of candidate videos having content relevance to the initial video, and a video duration of the candidate video being greater than a video duration of the initial video;

performing matching detection on the initial video and the plurality of candidate videos, to select a candidate video whose degree of matching with the initial video is greater than a threshold from the video recommendation list as the target video; and displaying the target video on the user interface in the second display mode.

16. The video display apparatus according to claim 13, wherein the displaying the target video selected from the video recommendation list associated with the initial video on the user interface in the second display mode comprises:

obtaining a current video image of the initial video;

obtaining the target video associated with the initial video;

searching the target video for a video timestamp corresponding to the current video image; and displaying the target video on the user interface in the second display mode by using the video timestamp as a current playback progress.

17. The video display apparatus according to claim 13, wherein when a video is displayed on the user interface in the first display mode, the method further comprises:

displaying a mode switching control on the user interface; and switching, in response to a trigger operation acting on the mode switching control, the video display mode of the user interface from the first display mode to the second display mode.

18. A non-transitory computer-readable medium, storing a computer program, the computer program, when executed by a processor, implementing:

displaying an initial video on a user interface in a first display mode;

obtaining, from one or more video sources, first videos suitable for being displayed in a second display mode;

adding content labels for identifying video content features of the first videos to the first videos, the content labels being based on a plurality of designated dimensions including video names, characters, video types;

performing clustering processing on the first videos according to label overlap ratios of the content labels to obtain a plurality of candidate video lists;

selecting a video recommendation list having content relevance to the initial video from the plurality of candidate video lists; and displaying, in response to a video display mode of the user interface being switched from the first display mode to the second display mode, a target video selected from the video recommendation list associated with the initial video on the user interface in the second display mode, the first display mode and the second display mode having different video content display directions, and the target video comprising at least part of video content of the initial video.

* * * * *